United States Patent
Cheung et al.

(10) Patent No.: US 9,166,777 B2
(45) Date of Patent: Oct. 20, 2015

(54) METHOD AND SYSTEM FOR USER AUTHENTICATION FOR COMPUTING DEVICES UTILIZING PKI AND OTHER USER CREDENTIALS

(75) Inventors: Kai Chung Cheung, Markham (CA); Christian K. Peel, Aurora (CA)

(73) Assignee: Echoworx Corporation, Toronto (CA)

( * ) Notice: Subject to any disclaimer, the term of this patent is extended or adjusted under 35 U.S.C. 154(b) by 899 days.

(21) Appl. No.: 13/412,036

(22) Filed: Mar. 5, 2012

(65) Prior Publication Data

US 2013/0232336 A1  Sep. 5, 2013

(51) Int. Cl.
*H04L 9/32* (2006.01)
*H04L 9/00* (2006.01)

(52) U.S. Cl.
CPC ............. *H04L 9/006* (2013.01); *H04L 9/3226* (2013.01); *H04L 9/3263* (2013.01)

(58) Field of Classification Search
USPC ........................................ 713/156
See application file for complete search history.

(56) References Cited

U.S. PATENT DOCUMENTS

| 2004/0098609 | A1* | 5/2004 | Bracewell et al. ............ 713/200 |
| 2007/0101418 | A1* | 5/2007 | Wood et al. ...................... 726/8 |
| 2008/0072301 | A1* | 3/2008 | Chia et al. ......................... 726/8 |

* cited by examiner

*Primary Examiner* — Tu Nguyen
(74) *Attorney, Agent, or Firm* — Bennett Jones LLP (57) ABSTRACT

A system and method for user authentication utilizing PKI credentials and user credentials on an electronic device comprising a mobile communication device, smart phone, a computer or other computing device.

10 Claims, 4 Drawing Sheets

METHOD AND SYSTEM FOR USER AUTHENTICATION FOR COMPUTING DEVICES UTILIZING PKI AND OTHER USER CREDENTIALS

FIELD OF THE INVENTION

This invention relates to electronic devices, and more particularly to a method and system for user authentication using PKI credentials and other user credentials for an electronic mobile communication device or a computing device configured with an operating system.

BACKGROUND OF THE INVENTION

The Lion™ operating system is the operating system typically installed on Apple computers such as the Mac™ and the Macbook™ devices. iOS (known as the iPhone™ Operating System) is a mobile operating system from Apple Inc. The iOS operating system was originally developed for the iPhone™ device. It has since been extended to other Apple devices such as the iPod™ touch device and the iPad™ tablet.

Windows™ is the operating system from Microsoft Corporation typically installed on the vast majority of personal computers.

Microsoft Corporation also has its Windows Phone™ operating system for mobile communication device platforms. Other operating systems for mobile device platforms include BlackBerry™ OS from Research In Motion and Android from Google.

Under the typical operating system, a device can be configured with user credentials, such as a user identifier, i.e. user id, and/or a password. In known manner, the user credentials provide an authentication mechanism for allowing a user to gain access to the device.

Similarly, the operating systems for other mobile devices or computing devices include a mechanism for configuring user credentials.

It will be appreciated that while such an authentication mechanism provides a layer of security, once the user credentials are compromised the device is exposed to a potentially malicious user or system.

Accordingly, there remains a need for improvement in the art.

BRIEF SUMMARY OF THE INVENTION

The present invention is directed to a method and system for user authentication using PKI (Public Key Infrastructure) credentials and other user credentials for an electronic communication device, a computer, and other types of computing devices or smart phones or mobile devices configured for an iOS based operating system, Windows™ based operating system or other types of operating systems or platforms.

According to one aspect, the present invention comprises a device configured for generating authentication credentials for a user associated with the device.

According to another aspect, the present invention comprises a computer-implemented method for generating authentication credentials for a user associated with a device.

According to another aspect, the present invention comprises a device configured for providing access to a user associated with the device based on an authentication of a plurality of credentials configured for the user.

According to another aspect, the present invention comprises a computer program product for setting up authentication credentials for a user associated with a device.

According to another aspect, the present invention comprises a computer program product for providing access to a user associated with a device based on authentication of a plurality of credentials configured for the user.

According to one embodiment, the present invention comprises a computing device configured for communication over a network, said computing device comprising: an application component configured for receiving a plurality of credentials for a user associated with the computing device and said plurality of credentials including a passcode, and a registration code from a credential management system; a component configured to generate one or more key pairs comprising public keys and private keys and including a digital signature public-private key pair and an encryption public-private key pair; a component configured to submit a certificate signing request to said credential management system, and said certificate signing request including said plurality of credentials, said registration code and said one or more public keys; a component configured to receive a certificate from said credential management system, said certificate being generated based on authentication of said credentials and on the registration code included in said certificate signing request; and a component configured for encrypting said one or more private keys with said passcode and storing said encrypted private keys locally.

According to another embodiment, the present invention comprises a computer-implemented method for configuring credentials associated with a user, said method comprising the steps of: inputting a passcode associated with the user; receiving a registration code from a credential management system; generating one or more key pairs comprising public keys and private keys and including a digital signature public-private key pair and an encryption public-private key pair; transmitting a certificate signing request to said credential management system, and said certificate signing request including said plurality of credentials, said registration code and said one or more public keys; receiving a certificate from said credential management system, said certificate being generated based on authentication of said credentials and on the registration code included in said certificate signing request; and encrypting said one or more private keys with said passcode and storing said encrypted private keys locally.

According to another embodiment, the present invention comprises computer-implemented method for authenticating a user for accessing an online application running on an application server from a computing device associated with the user, said method comprising the steps of: submitting a login request to the application server; transmitting a random session identifier from the application server to the computing device; prompting the user to enter one or more credentials including a passcode; retrieving an encrypted private digital signature key stored at the computing device and decrypting said encrypted private digital signature key with said passcode; signing said random session identifier with said decrypted private digital signature key; transmitting said signed random session identifier and said one or more credentials to the application server; verifying said signed random session identifier and said one or more credentials; and authorizing the login request based on the verification of said signed random session identifier and said one or more credentials associated with the user.

According to another embodiment, the present invention comprises a system for authenticating a user for accessing from a computing device an application running on an application server operatively coupled, said system comprising: a component configured to transmit a login request to the application server and receive a random session identifier from the application server; an interface component configured to receive one or more credentials including a passcode entered by the user; a component configured to retrieve an encrypted private signature key stored locally and to decrypt said encrypted private signature key utilizing said passcode entered by the user; a component configured to sign said random session identifier with said decrypted private signature key; a component configured to transmit said signed random session identifier and said one or more user credentials to the application server; a component running on the application server configured to verify said signed random session identifier and said one or more user credentials; and a component running on the application server configured to authorize the login request based on the verification of said signed random session identifier and said one or more credentials associated with the user.

According to another embodiment, the present invention comprises a computer program product for configuring credentials associated with a user, said computer program product comprising: a storage medium configured to store computer readable instructions; said computer readable instructions including instructions for, inputting a passcode associated with the user; receiving a registration code from a credential management system; generating one or more key pairs comprising public keys and private keys and including a digital signature public-private key pair and an encryption public-private key pair; transmitting a certificate signing request to said credential management system, and said certificate signing request including said plurality of credentials, said registration code and said one or more public keys; receiving a certificate from said credential management system, said certificate being generated based on authentication of said credentials and on the registration code included in said certificate signing request; and encrypting said one or more private keys with said passcode and storing said encrypted private keys locally.

According to another embodiment, the present invention comprises a computer program product for authenticating a user for accessing an online application running on an application server from a computing device associated with the user, said computer program product comprising: a storage medium configured to store computer readable instructions; said computer readable instructions including instructions for, submitting a login request to the application server; transmitting a random session identifier from the application server to the computing device; prompting the user to enter one or more credentials including a passcode; retrieving an encrypted private digital signature key stored at the computing device and decrypting said encrypted private digital signature key with said passcode; signing said random session identifier with said decrypted private digital signature key; transmitting said signed random session identifier and said one or more credentials to the application server; verifying said signed random session identifier and said one or more credentials; and authorizing the login request based on the verification of said signed random session identifier and said one or more credentials associated with the user.

Other aspects and features of the present invention will become apparent to those ordinarily skilled in the art upon review of the following exemplary embodiments of the invention in conjunction with the accompanying figures.

BRIEF DESCRIPTION OF THE DRAWINGS

Reference will now be made to the accompanying drawings, which show by way of example, embodiments according to the present invention, and in which.

Like reference numerals indicate like elements or components in the drawings.

DETAILED DESCRIPTION OF THE EMBODIMENTS

Figure 1:
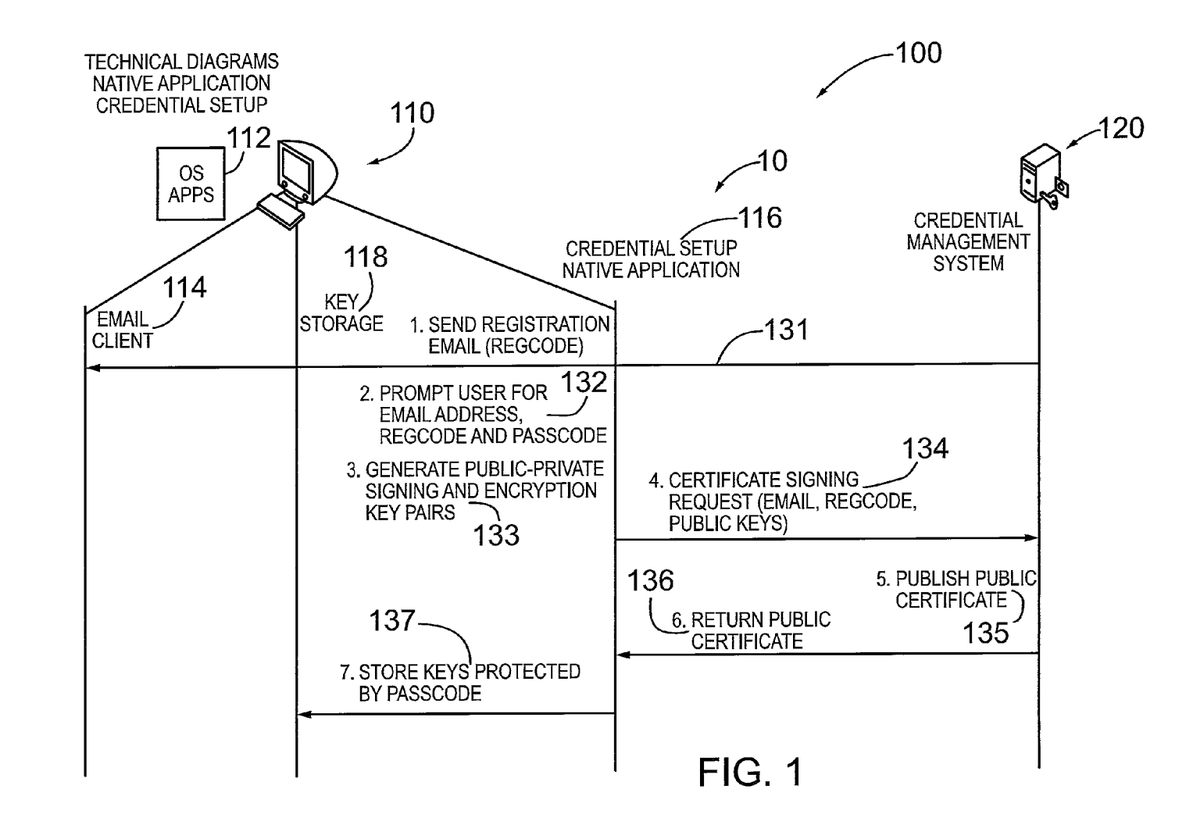
FIG. 1 is a flow-diagram showing a process for setting up authentication credentials for a native application running on a computing device according to an embodiment of the present invention.

Reference is made to FIG. 1, which shows in diagrammatic form an exemplary system incorporating a mechanism and process for setting up or configuring authentication credentials for a native application (e.g. computer program or software application) running or installed on a computer or other type of computing device according to an embodiment of the invention, and indicated generally by reference 100.

The system 100 comprises an electronic device 110 and a credential management system 120. The electronic device 110 and the credential management system 120 are operatively coupled for communication through a communication network indicated generally by reference 10. The electronic device 110 may comprise a desktop computer, a notebook computer, or other type of computer. According to another aspect, the electronic device 110 may comprises a "smart phone" such as the iPhone™ handheld device from Apple Inc., a BlackBerry™ device from Research In Motion, or other mobile communication device, or another type of computing device or tablet such as an iPAD™ device, also from Apple Inc.

Referring to FIG. 1, the computer 110 is operatively coupled to a communication network and configured to transmit and receive email messages and other types of data and/or voice communications. According to an embodiment, the communication network comprises a wide area wireless network, for example, a cellular network. According to an embodiment, the communication network provides Internet access. One or more email servers, e.g. remote servers, (not shown) are operatively to the communication network either through the Internet or directly through a transceiver (not shown). According to another exemplary implementation, the device 110 is operatively coupled to a local area network or LAN, for example, a wireless LAN (WLAN), WI-Fi or Bluetooth based connection. One or more email servers (not shown) are operatively coupled to the wireless WLAN. In known manner, the communication networks provide the capability for the computer or device 110 to transmit and receive email messages and other types of messages or data communications from the remote or local remote servers, for example, configured as email servers.

The computer 110 is configured with an operating system (for example, Microsoft Windows™, Apple iOS™, etc.) and runs one or more computer programs or applications indicated generally by reference 112. The computer 110 is configured with a communication module or interface. The communication module is implemented and configured in known manner, and provides the capability for the device 110 to interface with the communication network, for example, as described above. The computer programs running on the computer 110 comprise an email module or client or application indicated generally by reference 114. The email module 114 is configured in known manner to provide the capability or facility to compose, transmit, receive and otherwise manage email communications and other types of communications or data messages. The computer 110 according to an embodiment of the present invention is configured with a credential setup application program (i.e. a native application) comprising a computer program or software and indicated generally by reference 116. As shown, the computer 110 is also configured with a key storage facility indicated generally by reference 118.

The key storage facility 118 comprises a secure facility configured locally, e.g. on the computer 110, for storing credentials, for example, digital signature and encryption keys, associated with a user. According to an embodiment, the key storage facility 118 comprises a local file system, for example, a key file (*.pfx) which is encrypted and protected using one or more passcodes and/or file access permissions. The key(s) are accessed through an input/output (I/O) application program interface (API) for the file system. According to another embodiment, the key storage facility 118 is configured for an iOS implementation, where the device 110 comprises an iPhone mobile communication device, or for a Lion™ operating system on an Apple computer. The iOS operating system includes a sandbox. The sandbox comprises a secure data repository, for example, configured in local device memory, and can be associated with one of the applications (i.e. Apps) installed on the computer or mobile device 110. According to an embodiment, a sandbox is configured and utilized for the credential setup application 116. The key(s) comprise a keychain database which is stored in the sandbox and further encrypted and protected by passcode(s). According to an exemplary implementation, the device 110 is configured with a keychain API for accessing the key(s). According to another embodiment, the key storage facility 118 is configured under the operating system, for example, in a Windows™ based implementation, utilizing the Microsoft Cryptographic Application Programming interface (MSCAPI) for the keystore facility. According to an exemplary implementation, the computer 110 is configured with a crypto API for accessing the key(s) in the keystore facility.

According to an exemplary embodiment, the computer or device 110 and the credential setup application 116 are configured to function with a SasS based credential management system such as the ESS system available from Echoworx Corporation in Toronto, Ontario, CANADA, and indicated generally by reference 120 in FIG. 1. According to an exemplary embodiment, the credential management system 120 is configured to operate as a Web-based service. The credential setup application 116 is configured to provide user credential and authentication functions, as will be described in more detail below.

As shown in FIG. 1, the system 100 is configured with a process to set up or configure credentials for a user according to an embodiment of the present invention. The first step in the process comprises receiving a registration email from the credential management system 120, as indicated by reference 131. According to an embodiment, the registration email is configured or includes a registration code (RegCode). In response, the credential setup (i.e. the native application) 116 is launched, and according to an embodiment, the user is prompted to enter: (1) email address; (2) the registration code (RegCode); and (3) a passcode, as indicated by reference 132. The passcode is used to encrypt the keys as described in more detail below. The credential setup application 116 is configured to generate public-private key pairs of signing and encryption keys as indicated generally by reference 133, for example, utilizing a Public Key Infrastructure or PKI. The credential setup application 116 is configured to execute or implement various known encryption/decryption mechanisms, techniques or algorithms, and can be updated according to current security best practices and developments. Next as indicated by reference 134, the credential setup application 116 is configured to submit or transmit a request in the form a "Certificate Signing Request" to the credential management system 120. According to an embodiment, the Certificate Signing Request comprises the email address, the Registration Code and the public keys. The credential management system 120 includes a computer program or software configured to authorize the request received from the native application 116, and publish a new certificate as indicated generally by reference 135. If the registration code (RegCode) received from the native application 116 is invalid or incorrect, the credential management system 120 is configured to reject the Certificate Signing Request. According to an exemplary implementation, the certificate is published to a Trusted Lookup Service. The credential management system 120 transmits or returns the certificate to the credential setup application 116 as indicated by reference 136 in FIG. 1. The credential setup application 116 receives the certificate and is configured to encrypt the keys, i.e. the private keys, with the passcode. The encrypted keys are securely stored or saved in memory comprising the key storage facility 118, as indicated generally by reference 137.

Figure 3:
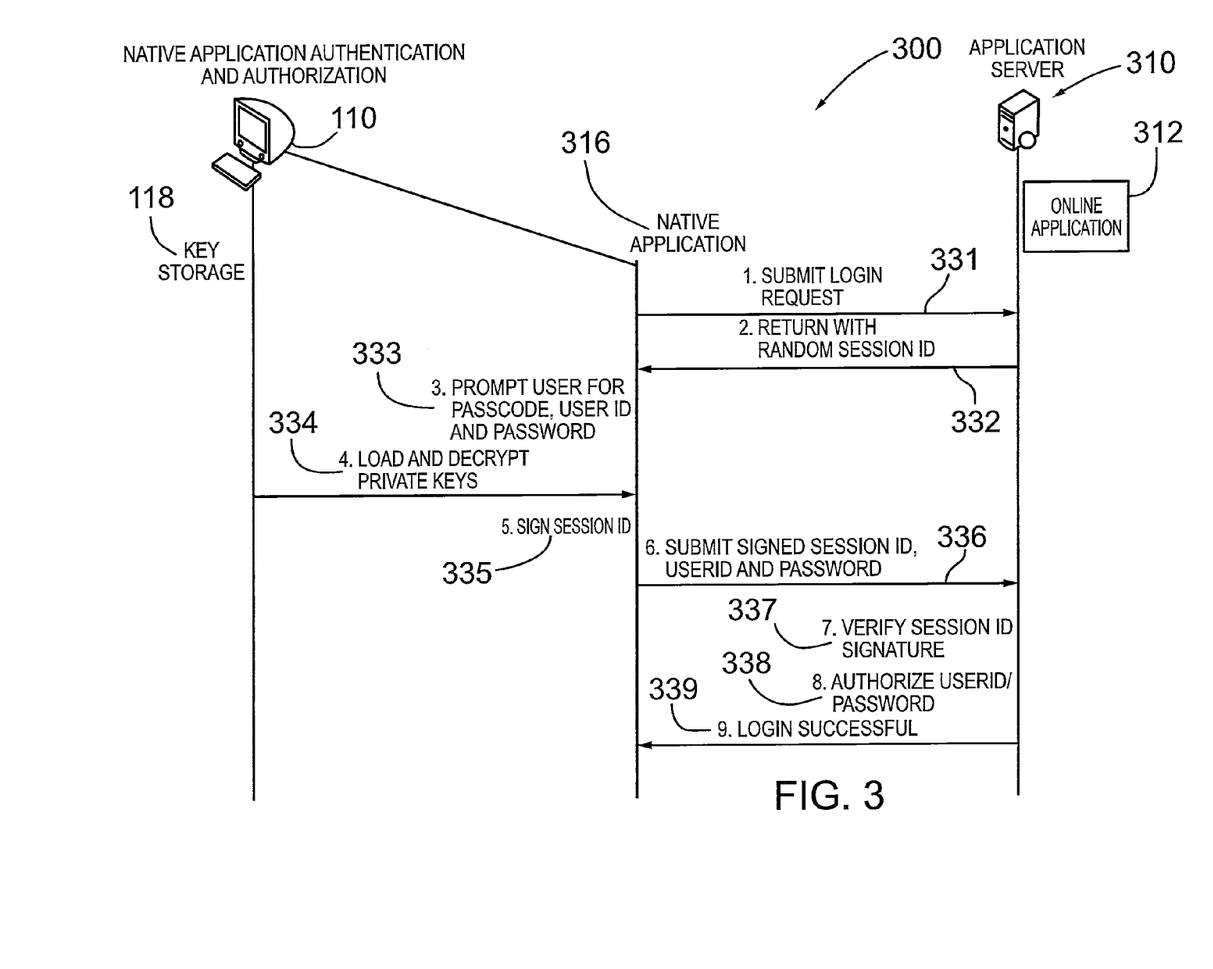
FIG. 3 is a flow-diagram showing a process for authenticating and authorizing a user for a native application (FIG. 1) running on a computing device according to an embodiment of the present invention.

Reference is next made to FIG. 3, which illustrates by way of example an authentication and authorization operation for providing access for a user to an online application through a native application client 316 according to an embodiment of the present invention and indicated generally by reference 300. In this example, the user of the device 110 wishes to log-on or gain access to an online application 312 running on an application server 310.

As indicated by reference 331, the native application or client 316 is installed on the computer 110 and is configured (e.g. through executable code or software) to submit a login request to the application server 310, for example, on startup or in response to a user request. The application server 310 is configured (e.g. through executable code or software) to generate or respond with a random session ID as indicated by reference 332. The native application 316 is configured to prompt the user to enter a passcode, a user identifier (i.e. user ID) and a password as indicated in step 333. The native application 316 loads the private key(s) associated with the user from the local key storage 118 (as also shown in FIG. 1) and is configured to utilize the passcode to decrypt the private keys as indicated by reference 334. The native application 316 then uses the decrypted private signature key to sign the random session ID (received from the application server 310) as indicated by step 335. The native application 316 is configured to submit or transmit the signed random session ID and the user ID and password to the application server 310 as indicated by reference 336. If the application server 310 is inaccessible (e.g. is offline or doesn't respond), then an exception condition occurs and the login procedure is terminated. The application server 310 (is configured for example through executable code or software) to authenticate the identity of the user, for example, by verifying the signature (i.e. the signed random session ID) as indicated in step 337. This ensures the random session ID issued by the application server 310 is associated with the correct or valid user ID. If the signature is invalid, has expired or is not correctly associated with the user ID, then the authentication operation is a fail and exception condition arises. Similarly, if the passcode or password provided by the native application 316 is incorrect, invalid or expired, or the private keys are missing (e.g. the random session ID is not signed by the private signature key), then an exception condition occurs and the authentication procedure fails and is terminated or suspended. Once the user is authenticated, the application server 310 is configured to authorize system access for the user by validating the user ID and the password in step 338. The application server 310 then returns a successful login (e.g. a landing page) to the native application 316 as indicated by reference 339 in FIG. 3.

Figure 2:
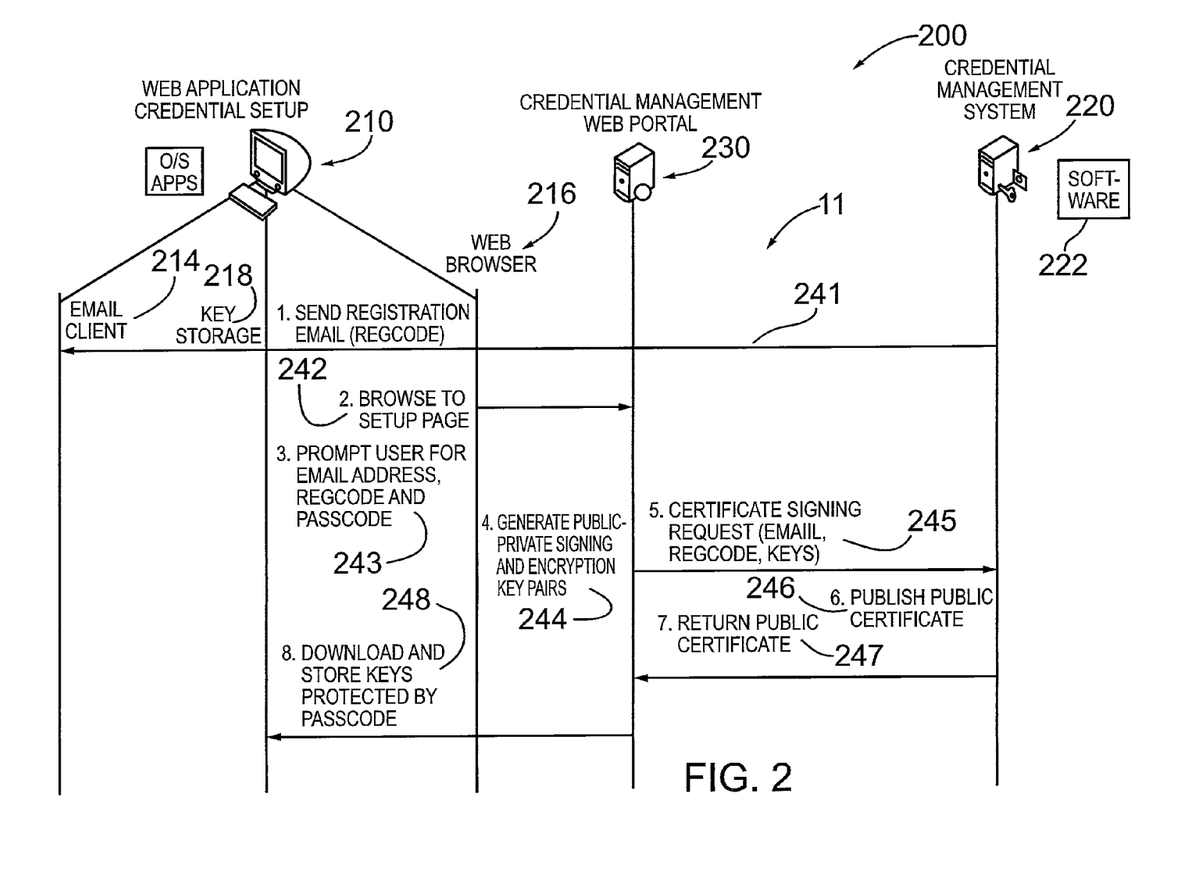
FIG. 2 is a flow-diagram showing a process for setting up authentication credentials for a web-based application running on a computing device according to an embodiment of the present invention.

Reference is next made to FIG. 2, which shows in diagrammatic form an exemplary system incorporating a mechanism and process for setting up or configuring authentication credentials for a user through a web-based application (e.g. an application accessed using a Web browser, such as Internet Explorer™ from Microsoft™ Corporation) according to an embodiment of the invention, and indicated generally by reference 200.

The system 200 includes a computing device (e.g. a computer) 210 and a credential management system 220. The computer 210 and the credential management system 220 are operatively coupled for communication through a communication network, for example, the Internet or World Wide Web (www), indicated generally by reference 11. The electronic device 210 may comprise any web enabled device, such as a desktop computer, a notebook computer, or according to another aspect, a "smart phone" such as the iPhone™ handheld device from Apple™ Inc., the BlackBerry™ handheld device from Research In Motion, or other mobile communication device, or another type of computing device, or a tablet such as an iPAD™ device, also from Apple™ Inc.

Referring still to FIG. 2, the computer 210 is operatively coupled to a communication network and configured to transmit and receive email messages and other types of data and/or voice communications. According to an embodiment, the communication network comprises a wide area wireless network, or the Internet. One or more email servers and/or other remote servers, (not shown) are operatively to the communication network. In known manner, the communication networks provide the capability for the computer 210 to transmit and receive email messages and other types of messages or data communications from the remote or local remote servers, for example, configured as email servers and/or application servers.

The computer 210 is configured with an operating system (for example, Microsoft Windows™, Apple Lion™, Apple iOS™, BlackBerry™ OS, etc.) and runs one or more computer programs or applications indicated generally by reference 212. The computer 210 is configured with a communication module or interface to provide connectivity to the network 11 (e.g. the Internet or World Wide Web). The computer programs running on the computer 210 comprise an email module or client or application indicated generally by reference 214 and a web browser application indicated generally by reference 216. The email module 214 is configured in known manner to provide the capability or facility to compose, transmit, receive and otherwise manage email communications and other types of communications or data messages. According to an embodiment, the computer 210 is configured with a web browser 216 (for example, Internet Explorer™ from Microsoft Corporation) to execute or run a web page based credential management application as described in more detail below. As shown, the computer 210 is also configured with a key storage facility indicated generally by reference 218. The key storage facility 218 can be implemented in a manner similar to that described above with reference to FIG. 1.

As shown in FIG. 2, the credential management system 220 according to this embodiment is configured with a credential management web portal indicated generally by reference 230. The credential management web portal 230 comprises a web-based interface configured with one or more web pages (e.g. a landing paging) accessed by the web browser 216 (e.g. Internet Explorer™ from Microsoft Corporation, or a web enabled mobile communication device or smart phone).

As shown in FIG. 2, the web-based application 200 is configured with a process for setting up or configuring credentials for a user utilizing the web portal 230. The process according to an exemplary implementation comprises executable code or computer software embodied or executed by the web browser 216, the credential management web portal 230 and/or the credential management system 220 and indicated by reference 222. The first step in the process comprises receiving a registration email from the credential management system 220, and the registration email includes a registration code (i.e. RegCode), as indicated generally by reference 241 in FIG. 2. The user then proceeds to launch the web browser 216 running on the computer 210 (for example, the Internet Explorer™ browser), as indicated by reference 242. According to an embodiment, the registration email can include embedded code or a link (e.g. HTML link) to launch the web browser and a landing page (i.e. a setup page in the credential management web portal 230). According to an embodiment, the credential web portal page 230 is configured as indicated by reference 243 to prompt the user to provide the following information or data: (1) email address; (2) registration code (i.e. RegCode); and (3) a passcode (which is used to encrypt the keys as described in more detail below). Next as indicated by reference 244, the credential management web portal 230 is configured (e.g. through executable code or software) to generate public-private key pairs for signing and encryption. The credential management web portal 230 is configured to then submit a "Certificate Signing Request" to the credential management system 220 as indicated by reference 245. According to an embodiment, the Certificate Signing Request includes the email address for the user, the registration code (RegCode) and the public key(s). The credential management system 220 is configured to authorize the request from the user's computer 210 (i.e. as indicated in step 245) and publishes a new public certificate (e.g. a PKI based certificate) which is accessible through a trust lookup service (e.g. a trusted authority or intermediary), as indicated by reference 246. The credential management system 220 also provides or returns a copy of the certificate to the credential management web portal, as indicated by reference 247. The credential management web portal 230 is configured to encrypt the keys (i.e. the private signature and encryption keys) utilizing the passcode. The encrypted keys can then be downloaded from the web browser 216 (i.e. the credential management web portal 230) to the key storage facility 218 and securely stored local to the computer 210, as indicated generally by reference 248. According to an exemplary web-based implementation, the web browser 216 is configured with a HTML5 FileReader API (Application Programming Interface) to provide a file system I/O API capability for locally storing the encrypted keys.

Figure 4:
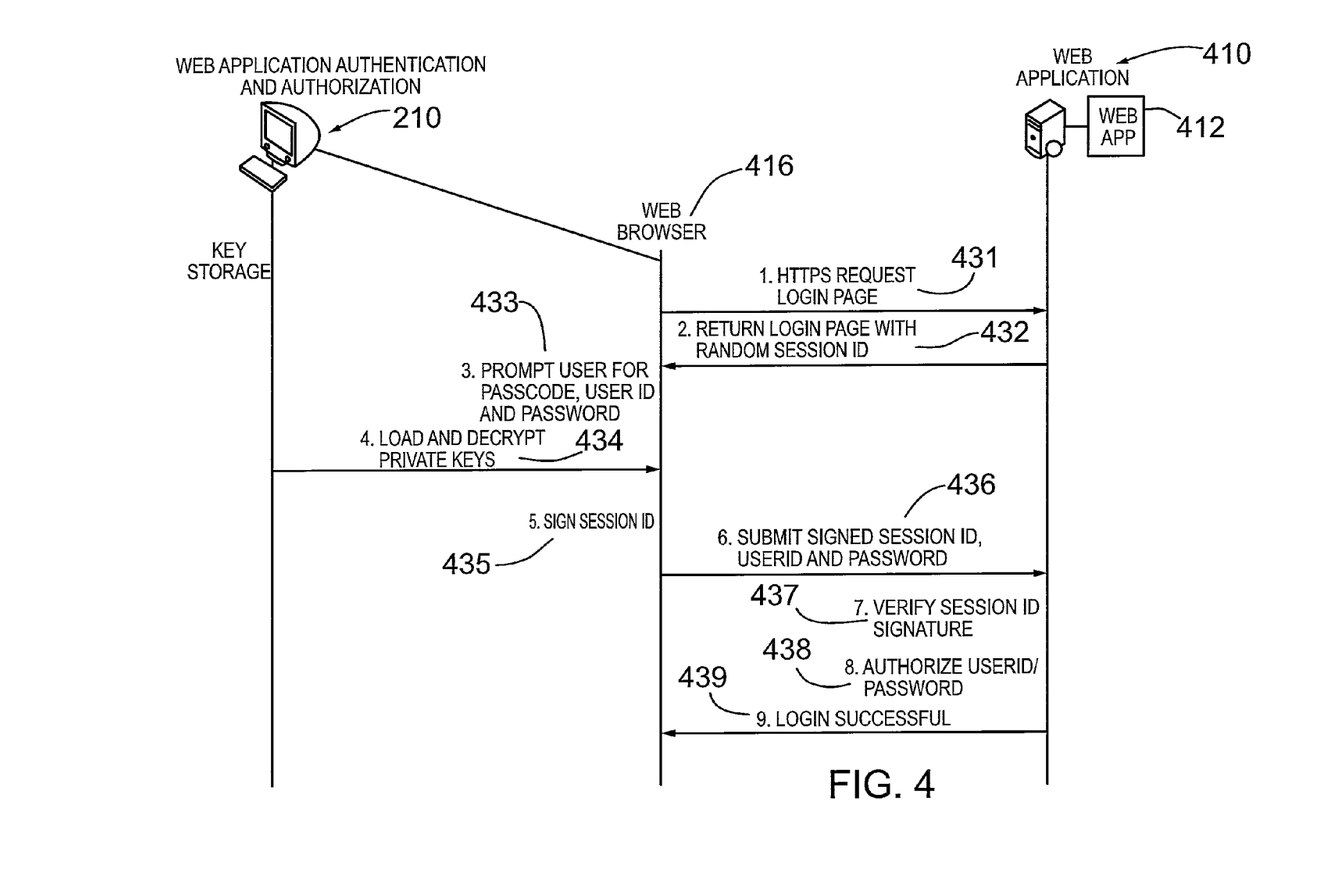
FIG. 4 is a flow-diagram showing a process for authenticating and authorizing a user for a web-based application (FIG. 2) running on a computing device according to an embodiment of the present invention.

Reference is next made to FIG. 4, which illustrates by way of example an authentication and authorization operation for a user utilizing a web browser 416 according to an embodiment of the present invention and indicated generally by reference 400. In this example, the user of the computer or mobile device 210 wishes to use the web browser 416 to log-on or access a web-based application 412 running on a web application server 410.

The user utilizes the web browser 416 (for example, an installed version of the Internet Explorer™ browser) to navigate to a login or landing page for the web application 412, for example, through a HTTPS request, as indicated generally by reference 431. The web application server 410 is configured (e.g. through executable code or software) to download the login page to the web browser 416 as indicated by reference 432. According to an embodiment, the login page includes a "random session ID" which is received from or generated by software or executable code on the web application server 410. The user is prompted on the login page to enter the passcode, the UserID and a password as indicated by reference 433. The web browser 416 is configured to load or retrieve the user's private keys from the key storage facility 218 (FIG. 2) and decrypt the private keys (i.e. signature and encryption keys) using the passcode provided by the user, as indicated by reference 434. If the passcode entered by the user is incorrect or the private key(s) are missing, then an exception condition exists and the authentication procedure is terminated. The web browser 416 uses the decrypted private signature key to "sign" the random session ID (issued by the web application 412) as indicated by reference 435, and the web browser 416 submits the signed random session ID to the web application server 410 together with the user ID and the user password, as indicated in step 436. If the web application server 410 is not accessible, e.g. off-line, then the login procedure is terminated. The web application 412 is configured to verify or authenticate the identity of the user, for example, by verifying the signature (i.e. the signed random session ID) as indicated in step 437. This ensures the random session ID issued by the web application server 410 is associated with the correct or valid user ID. If the signature is invalid, has expired or is not correctly associated with the user ID, then the authentication operation is a fail and exception condition arises. Once the user has been authenticated, the web application server 410 is configured to authorize system access, i.e. log in, for the user by validating the user ID and the password provided by the user through the web browser 416. If the user ID and/or password is invalid or expired, then the web application server 410 terminates the log in for the user.

The credential setup application 116, the credential management web portal 230, the application components or modules for the web browser 216 and other functional components or modules of the system 100 can be implemented in known manner and comprise one or more computer programs, software, computer readable and executable code components, modules or objects to provide the functions, features and functionality as described herein, and stored or embedded on computer readable media, storage media, or other digital storage media or devices. The particular implementation details will be readily within the understanding of one skilled in the art.

The present invention may be embodied in other specific forms without departing from its spirit or essential characteristics. The embodiments described and disclosed are to be considered in all aspects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for authenticating a user for accessing an online application running on an application server from a computing device associated with the user, said method comprising the steps of:
    submitting a login request to the application server;
    transmitting a random session identifier from the application server to the computing device;
    prompting the user to enter one or more credentials including a passcode;
    retrieving an encrypted private digital signature key stored at the computing device and decrypting said encrypted private digital signature key with said passcode;
    signing said random session identifier with said decrypted private digital signature key;
    transmitting said signed random session identifier and said one or more credentials to the application server;
    verifying said signed random session identifier and said one or more credentials; and
    authorizing the login request based on the verification of said signed random session identifier and said one or more credentials associated with the user.

2. The computer-implemented method as claimed in claim 1, wherein step of submitting a login request comprises running an application running on an operating system installed for the computing device and said application being configured for prompting the user to enter said one or more credentials including said passcode.

3. The computer-implemented method as claimed in claim 2, wherein said application comprises a web browser configured to download a web page from the application server, and said web page being configured for prompting the user to enter said one or more credentials including said passcode.

4. A system for authenticating a user for accessing from a computing device an application running on an application server operatively coupled, said system comprising:
    a component configured to transmit a login request to the application server and receive a random session identifier from the application server;
    an interface component configured to receive one or more credentials including a passcode entered by the user;
    a component configured to retrieve an encrypted private signature key stored locally and to decrypt said encrypted private signature key utilizing said passcode entered by the user;
    a component configured to sign said random session identifier with said decrypted private signature key;
    a component configured to transmit said signed random session identifier and said one or more user credentials to the application server;
    a component running on the application server configured to verify said signed random session identifier and said one or more user credentials; and
    a component running on the application server configured to authorize the login request based on the verification of said signed random session identifier and said one or more credentials associated with the user.

5. The system as claimed in claim 4, wherein the computing device is configured with a key storage facility for locally storing one or more of said encrypted private keys.

6. The system as claimed in claim 5, wherein said key storage facility comprises a key file *.pfx structure and said key file being encrypted with said passcode.

7. The system as claimed in claim 5, wherein said key storage facility comprises a keychain database configured in a sandbox file structure running an iOS based operating system, and said keychain database is encrypted utilizing said passcode.

8. The system as claimed in claim 5, wherein said key storage facility comprises a cryptographic application programming interface configured for a Windows based operating system, and said private keys are encrypted under the Windows based operating system.

9. The system as claimed in claim 5, wherein said computing device comprises a mobile communication device, and the key storage facility is configured for an operating system running on said mobile communication device including an iOS based operating system, a BlackBerry OS operating system, an Android based operating system or a Windows Phone based operating system.

10. A computer program product for authenticating a user for accessing an online application running on an application server from a computing device associated with the user, said computer program product comprising:

a non-transitory storage medium configured to store computer readable instructions;

said computer readable instructions including instructions for, submitting a login request to the application server;

transmitting a random session identifier from the application server to the computing device;

prompting the user to enter one or more credentials including a passcode;

retrieving an encrypted private digital signature key stored at the computing device and decrypting said encrypted private digital signature key with said passcode;

signing said random session identifier with said decrypted private digital signature key;

transmitting said signed random session identifier and said one or more credentials to the application server;

verifying said signed random session identifier and said one or more credentials; and authorizing the login request based on the verification of said signed random session identifier and said one or more credentials associated with the user.

* * * * *